(12) United States Patent
Li et al.

(10) Patent No.: US 10,235,773 B2
(45) Date of Patent: Mar. 19, 2019

(54) IMAGE CAPTURING DEVICE AND CALIBRATION METHOD OF PHASE DETECTION AUTOFOCUS THEREOF

(71) Applicant: Altek Semiconductor Corp., Hsinchu (TW)

(72) Inventors: Yun-Chin Li, Hsinchu (TW); Chia-Chun Tseng, Hsinchu (TW); Wen-Yan Chang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 98 days.

(21) Appl. No.: 15/489,760

(22) Filed: Apr. 18, 2017

(65) Prior Publication Data

US 2018/0183991 A1  Jun. 28, 2018

(30) Foreign Application Priority Data

Dec. 26, 2016  (TW) ............................. 105143137 A

(51) Int. Cl.
| | |
|---|---|
| *G02B 7/36* | (2006.01) |
| *G02B 7/34* | (2006.01) |
| *G06T 7/80* | (2017.01) |
| *H04N 5/232* | (2006.01) |

(52) U.S. Cl.
CPC ............... *G06T 7/80* (2017.01); *G02B 7/34* (2013.01); *G02B 7/36* (2013.01); *H04N 5/232122* (2018.08); *H04N 5/232123* (2018.08)

(58) Field of Classification Search
CPC combination set(s) only.
See application file for complete search history.

(56) References Cited

U.S. PATENT DOCUMENTS

| | | | |
|---|---|---|---|
| 2012/0092545 A1* | 4/2012 | Sugawara | G02B 7/285 348/345 |
| 2016/0006948 A1 | 1/2016 | Takao | |
| 2017/0230649 A1* | 8/2017 | Galor Gluskin | H04N 17/002 |

FOREIGN PATENT DOCUMENTS

| | | |
|---|---|---|
| CN | 102103248 | 6/2011 |
| TW | 200809832 | 2/2008 |
| TW | I324015 | 4/2010 |

(Continued)

OTHER PUBLICATIONS

"Office Action of Taiwan Counterpart Application," dated Aug. 23, 2017, p. 1-p. 5.

*Primary Examiner* — Ahmed A Berhan
(74) *Attorney, Agent, or Firm* — JCIPRNET

(57) ABSTRACT

An image capture device and a calibration method of phase detection autofocus thereof are provided. A contrast-based autofocus procedure is executed to move a lens to multiple lens positions, and a statistical distribution of focus values is obtained based on the contrast-based autofocus procedure. Whether the phase linear relationship for a phase detection autofocus procedure is calibrated is determined according to the statistical distribution of the focus values. If yes, then a first phase difference detected when the lens is located at one of the lens positions is obtained, and a second phase difference detected when the lens is located at another one of the lens positions is obtained. The phase linear relationship of the phase detection autofocus procedure is calibrated according to the one of the lens positions, the first phase difference, the other one of the lens positions, and the second phase difference.

14 Claims, 5 Drawing Sheets

(56) References Cited

FOREIGN PATENT DOCUMENTS

TW    201022859    6/2010
TW    201603572    1/2016

* cited by examiner

IMAGE CAPTURING DEVICE AND CALIBRATION METHOD OF PHASE DETECTION AUTOFOCUS THEREOF

CROSS-REFERENCE TO RELATED APPLICATION

This application claims the priority benefit of Taiwan application serial no. 105143137, filed on Dec. 26, 2016. The entirety of the above-mentioned patent application is hereby incorporated by reference herein and made a part of this specification.

BACKGROUND OF THE INVENTION

Field of the Invention

The invention relates to an image capture device, and more particularly, to an image capture device and a calibration method of phase detection autofocus thereof.

Description of Related Art

To facilitate the rapid capture of clear images, the camera on a portable electronic device generally is provided with autofocus (AF) function that can actively detect objects in the field of view of the camera and automatically move the lens to focus on the objects when the user starts the camera. The current camera generally directly moves the lens to the focus position in one step after the focus position of the subject is calculated to reduce focus time. For instance, if the camera adopts phase detection autofocus (PDAF) to perform focus, then the camera obtains the phase detection data of the image by using an image sensor and estimates the focus position according to the linear relationship between the phase detection data and lens position. As a result, the camera can move the lens to the focus position in one step based on phase detection autofocus to rapidly complete the focus action. Using FIG. 1 as an example, FIG. 1 shows a linear relationship between phase difference and lens offset amount, wherein the horizontal axis represents the lens offset amount and the vertical axis represents phase difference. Therefore, in terms of a linear relationship 10 of FIG. 1, if a phase difference Pd1 is detected during the phase detection autofocus procedure, then the camera needs to move the lens by a lens offset amount offs1 to complete autofocus.

Therefore, the linear relationship between the phase detection data and the lens position can directly affect the accuracy of phase detection autofocus, and the linear relationship is generally obtained in the manufacturing process of the camera via experiments or testing. However, the linear relationship for phase detection autofocus is offset with environment temperature, humidity, or operating voltage. Therefore, during actual operation of the camera, the factory default linear relationship may not be suitable due to changes in the operating environment or the circuit operating condition, such that the issue of inaccurate focus occurs. Therefore, the camera may need more time to accurately focus or experiment with different linear relationships for different application environments, but the method is time consuming and inefficient.

SUMMARY OF THE INVENTION

Accordingly, the invention provides an image capture device and a calibration method of phase detection autofocus thereof, in which the phase linear relationship for phase detection autofocus is adjusted according to phase detection data detected in an actual operating environment such that the autofocus accuracy of the camera can be improved.

The invention provides a calibration method of phase detection autofocus suitable for an image capture device having a lens. The method includes the following steps. A contrast-based autofocus procedure is executed to move a lens to a plurality of lens positions, and a statistical distribution of focus values and an optimal focus position are obtained based on the contrast-based autofocus procedure. Whether to calibrate the phase linear relationship for a phase detection autofocus procedure is determined according to the statistical distribution of the focus values. If the phase linear relationship for the phase detection autofocus procedure is to be calibrated, then a first phase difference detected when the lens is located at one of the lens positions is obtained and a second phase difference detected when the lens is located at another one of the lens positions is obtained. The phase linear relationship of the phase detection autofocus procedure is calibrated according to the one of the lens positions, the first phase difference corresponding to the one of the lens positions, the another one of the lens positions, and the second phase difference corresponding to the another one of the lens positions.

In an embodiment of the invention, before the step of the contrast-based autofocus procedure is executed, the method further includes the following steps. The phase detection autofocus procedure is executed according to the phase linear relationship to move the lens to a temporary focus position according to the phase detection autofocus procedure. The step of executing the contrast-based autofocus procedure includes the following steps. The contrast-based autofocus procedure is executed in response to the lens reaching to the temporary focus position to obtain a statistical distribution of focus values and an optimal focus position.

In an embodiment of the invention, the one of the lens positions is the optimal focus position obtained based on the contrast-based focus procedure, and the optimal focus position corresponds to the maximum value in the focus values.

In an embodiment of the invention, the step of determining whether to calibrate the phase linear relationship for the phase detection autofocus procedure according to the statistical distribution of the focus values includes the following steps. A statistical property of a statistical distribution is obtained and whether the statistical property meets a preset condition is determined. The phase linear relationship for the phase detection autofocus procedure is calibrated if the statistical property meets the preset condition. The phase linear relationship for the phase detection autofocus procedure is not calibrated if the statistical property does not meet the preset condition.

In an embodiment of the invention, the statistical property includes a statistical variance, and the preset condition includes whether or not a threshold value is exceeded.

In an embodiment of the invention, the step of calibrating the phase linear relationship of the phase detection autofocus procedure according to the one of the optimal focus positions, the first phase difference corresponding to the one of the lens positions, the another one of the lens positions, and the second phase difference corresponding to the another one of the lens positions includes the following steps. A first corrected slope is calculated according to the one of the lens positions, the first phase difference corresponding to the one of the lens positions, the another one of the lens positions, and the second phase difference corresponding to the another one of the lens positions. The phase linear relationship between the lens positions and a plurality of phase differences is corrected according to the first corrected slope.

In an embodiment of the invention, the step of correcting the phase linear relationship according to the first corrected slope includes the following steps. A reference datum slope is obtained. The reference datum slope is adjusted according to the difference of the first corrected slope and the reference datum slope to obtain a second corrected slope. The phase linear relationship is corrected using the second corrected slope.

In an embodiment of the invention, the reference datum slope includes a factory default slope or a statistical value of a plurality of history work slopes of a plurality of history phase linear relationships of different time points.

From another perspective, the invention provides an image capture device including an optical system, an image sensor, a lens control circuit, a phase detection autofocus circuit, and a processing circuit. The optical system includes a lens, and the image sensor is coupled to the optical system. The lens control circuit is coupled to the optical system and controls the lens to move to a plurality of lens positions. The phase detection autofocus circuit is coupled to the image sensor and the lens control circuit and detects a plurality of phase differences corresponding to the lens positions. The processing circuit is coupled to the image sensor, the phase detection autofocus circuit, and the lens control circuit. The processing circuit executes a contrast-based autofocus procedure and moves the lens to the lens positions via the lens control circuit and obtains a statistical distribution of a plurality of focus values. The processing circuit determines whether to calibrate the phase linear relationship for a phase detection autofocus procedure according to the statistical distribution of the focus values. If the phase linear relationship for the phase detection autofocus procedure is to be calibrated, then the processing circuit obtains a first phase difference detected by the phase detection autofocus circuit when the lens is located at one of the lens positions and obtains a second phase difference detected by the phase detection autofocus circuit when the lens is located at another one of the lens positions. The processing circuit calibrates the phase linear relationship of the phase detection autofocus procedure according to the one of the lens positions, the first phase difference corresponding to the one of the lens positions, the another one of the lens positions, and the second phase difference corresponding to the one of the another lens positions.

Based on the above, in an embodiment of the invention, whether the phase linear relationship for the phase detection autofocus procedure is calibrated can be decided according to the statistical property of the statistical distribution of focus values obtained in the contrast-based autofocus procedure. In other words, the reliability of the phase detection data can be identified according to the statistical distribution of focus values, and therefore a phase linear relationship more conforming to the actual application environment can be instantly estimated by a highly reliable phase detection data. As a result, the accuracy and stability of the phase detection autofocus procedure can be significantly increased by the suitable and instant adjustment of the phase linear relationship.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
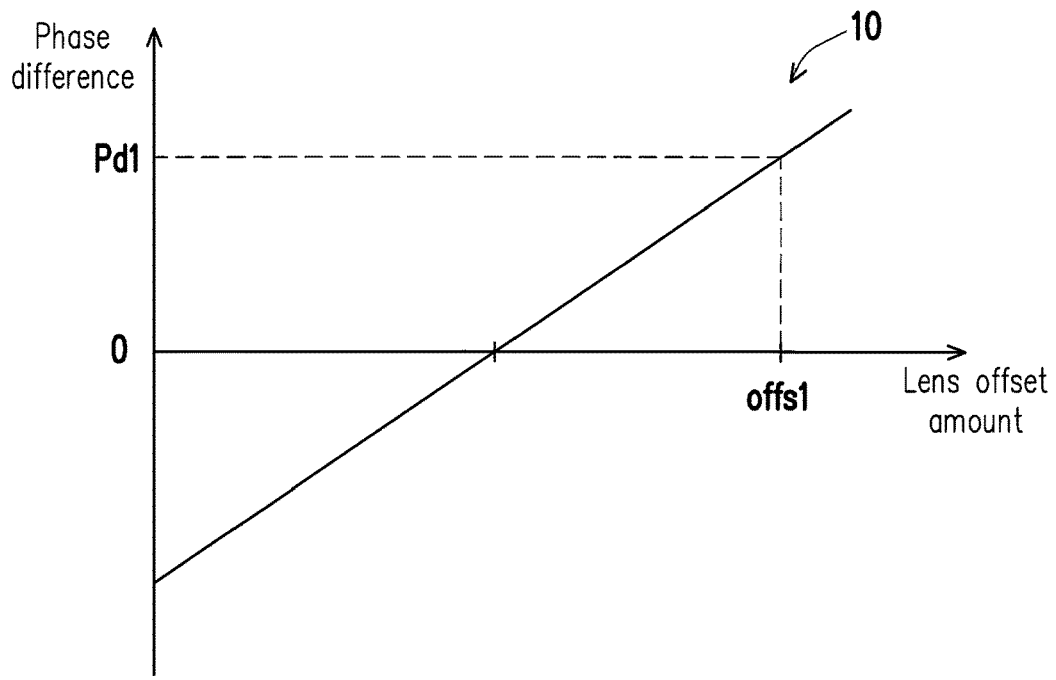
FIG. 1 shows a linear relationship between phase difference and lens offset amount.

A portion of the embodiments of the invention is described in detail hereinafter with reference to figures. In the following, the same reference numerals in different figures should be considered to represent the same or similar elements. These embodiments are only a portion of the invention and do not disclose all of the possible implementations of the invention. More precisely, these embodiments are only examples of the method and the image capture device in the patent scope of the invention.

Figure 2:
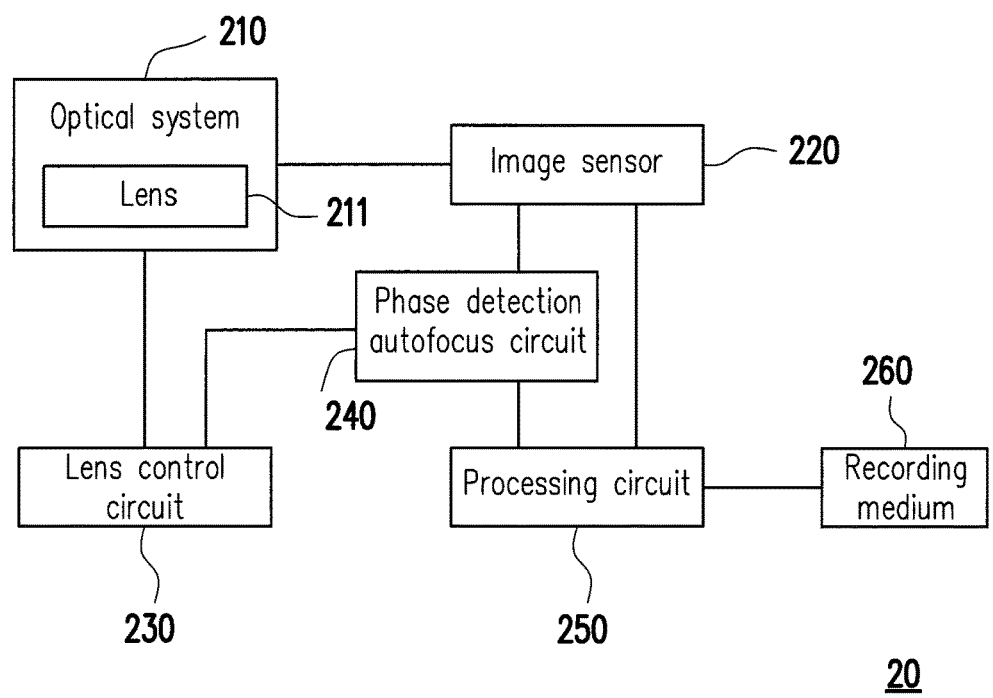
FIG. 2 is a schematic diagram of an image capture device shown according to an embodiment of the invention.

FIG. 2 is a schematic diagram of an image capture device shown according to an embodiment of the invention, but is only intended to facilitate explanation and not limit the invention. Referring to FIG. 2, an image capture device 20 of the present embodiment is, for instance, a digital camera, a digital video camcorder (DVC), or a camera disposed on an electronic device such as a mobile phone, a tablet computer, a notebook computer, a navigation device, or a dashboard camera that can provide camera function. The image capture device 20 includes an optical system 210, an image sensor 220, a lens control circuit 230, a phase detection autofocus circuit 240, and a processing circuit 250. In addition to the above elements, the image capture device 20 can have other hardware, software, or firmware elements depending on the functionality provided, but the invention is not limited thereto, and a recording medium 260 that can store data or software programs or a display (not shown) . . . etc. can be included.

The optical system 210 includes a lens 211, and the optical system 210 can also include an element such as an actuator, an aperture, or a shutter, wherein the lens 211 is formed by the combination of at least one concave-convex lens and is driven by an actuator such as a stepper motor or a voice coil motor (VCM) to change the relative position between the lenses so as to change the focal lengths of the lenses. The aperture can control the amount of light admitted, and the shutter is used to control the length of time of the light entering the lens, and the combination thereof with the aperture affects the amount of light exposure of the image captured by the image sensor 220.

The image sensor 220 is coupled to the optical system 210, wherein a charge-coupled device (CCD), complementary metal-oxide semiconductor (CMOS) element, or other types of photosensitive devices are provided thereto to sense the light intensity entering the optical system 210 to produce an image. It should be mentioned that, the image sensor 220 includes a plurality of pixels arranged into an array. In the present embodiment, a portion of the pixels is configured as phase detection pixels that perform phase detection by partially shielding the pixels. The phase detection autofocus circuit 240 is, for instance, implemented by an integrated circuit (IC) that can receive an image signal captured by phase detection pixels during image capture and calculate the phase difference between the image signals captured by each pair of phase detection pixels. Moreover, the phase detection autofocus circuit 240 can correspondingly obtain one lens offset amount for moving the lens to the phase detection autofocus position based on the phase difference calculated thereby to complete the phase detection autofocus procedure.

The lens control circuit 230 is implemented by, for instance, a microprocessor, a digital signal processor, a programmable controller, an application-specific integrated circuit, or other similar devices, and is used to control the actuator in the optical system 210 to drive the lens 211 to change the focusing distance thereof. In the present embodiment, the lens control circuit 230 further includes receiving the lens offset amount from the phase detection autofocus circuit 240 calculated thereby to accordingly control the optical system 210 to move the lens 211.

The processing circuit 250 is, for instance, a central processing unit (CPU) or other programmable general-use or specific-use microprocessors or digital signal processors (DSP) . . . etc., and can be used to control the image sensor 220, the lens control circuit 230, and the phase detection autofocus circuit 240. In the present embodiment, the processing circuit 250 can analyze images captured by the image sensor 220 to obtain an optimal focus position having a peak value or maximum value at the focus value according to the image content. In general, the focus value is the picture contrast value or amount of the high-frequency component in the image, and can be obtained by different algorithms, and the invention is not limited thereto.

The recording medium 260 can be a fixed or movable random access memory (RAM), read-only memory (ROM), flash memory, hard disk, or any other types of non-transient, volatile, and non-volatile memory, or a combination of these devices. The recording medium 260 records programs, software, or image data accessible by the processing circuit 250.

Figure 3:
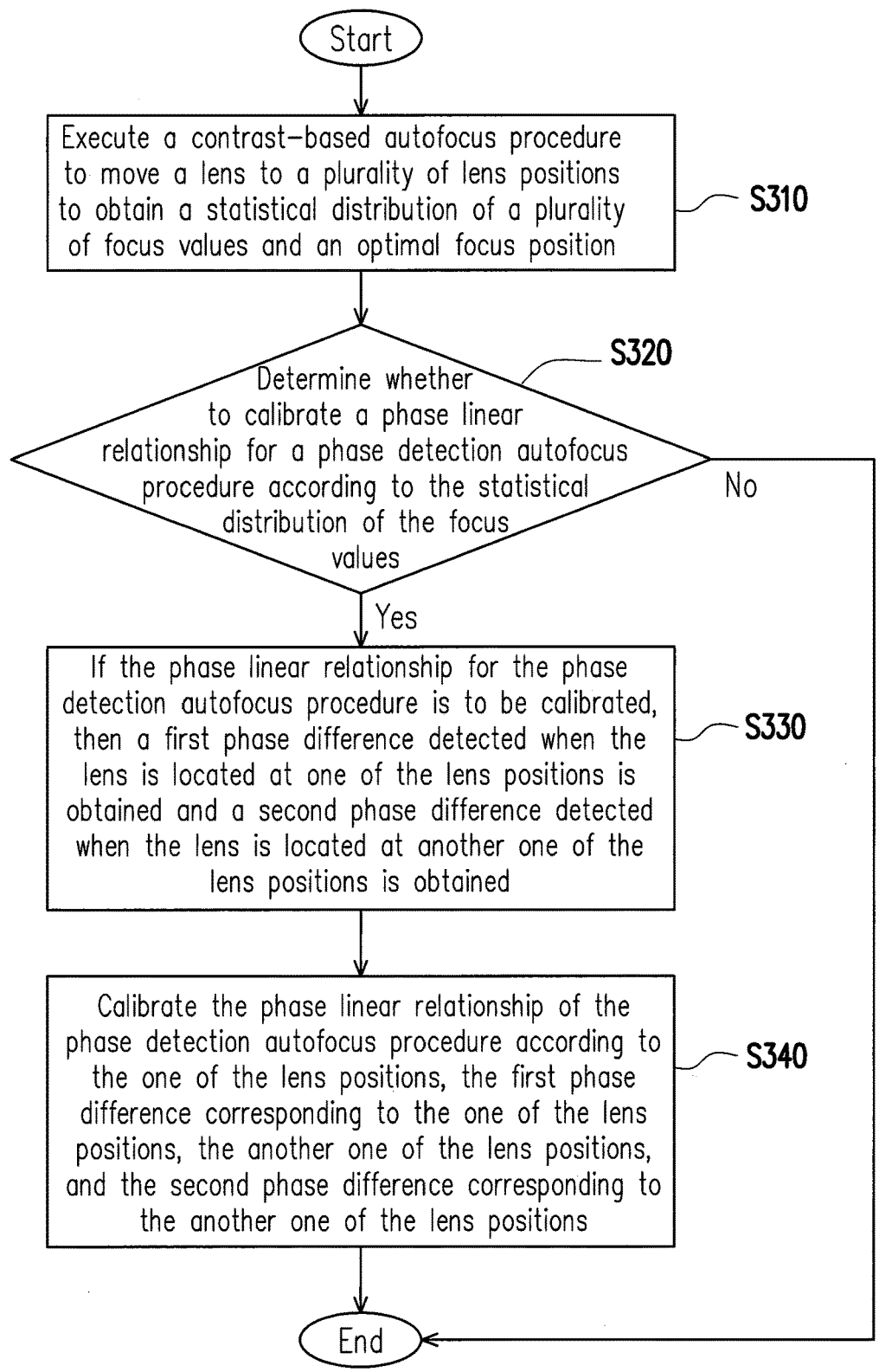
FIG. 3 is a flowchart of a calibration method of phase detection autofocus shown according to an embodiment of the invention.

FIG. 3 is a flowchart of a calibration method of phase detection autofocus shown according to an embodiment of the invention. Referring to both FIG. 2 and FIG. 3, the method of the present embodiment is suitable for the image capture device 20 of FIG. 2, and the steps of the calibration method of phase detection autofocus of the present embodiment is described hereinafter with reference to each element of the image capture device 20 in FIG. 2.

First, in step S310, the processing circuit 250 executes a contrast-based autofocus procedure to move the lens 211 to a plurality of lens positions and obtain a statistical distribution of a plurality of focus values and an optimal focus position. Specifically, the processing circuit 250 may start the live view function after the user starts the camera function to capture images using the image sensor 220. When the contrast-based autofocus procedure is executed, the processing circuit 250 moves the lens 211 to a plurality of lens positions in order via the lens control circuit 230, and the processing circuit 250 controls the image sensor 220 to capture a plurality of images corresponding to different lens positions in order. The processing circuit 250 extracts the high-frequency components of the plurality of images in order to calculate focus value of each of the images so as to obtain a plurality of focus values corresponding to a plurality of lens positions and a statistical distribution thereof. In particular, since the focus value of the image captured by the lens 211 at the optimal focus position has a peak value or a maximum value, the lens position corresponding to the maximum value in the focus value can be regarded as the optimal focus position. Since the contrast-based autofocus procedure needs to read a plurality of images to determine the optimal focus position, more accurate autofocus results can be provided. However, the invention does not limit the calculation method of the focus values. For instance, the processing circuit 250 can obtain the focus value (can also be referred to as contrast value) of each of the images using Laplace transformation or a finite/infinite impulse response filter.

In step S320, the processing circuit 250 determines whether to calibrate the phase linear relationship for the phase detection autofocus procedure according to the statistical distribution of the focus values. It should be mentioned that, the reliability of the phase detection autofocus circuit 240 detected by the image sensor 220 and image content of the phase detection data are related, and this property is also observed with the reliability and image content of the focus values. In other words, when the high-frequency components in the images are abundant and the processing circuit 250 can effectively extract the high-frequency components of the images to obtain a plurality of highly reliable contrast values, the phase detection data detected by the phase detection autofocus circuit 240 at this point is also accurate and highly reliable. Therefore, in the present embodiment, by analyzing the statistical distribution of the focus values, the processing circuit 250 can evaluate whether the phase detection data currently detected by the phase detection autofocus circuit 240 using phase detection pixels is accurate and reliable. It should be mentioned that, in the invention, whether the phase linear relationship is calibrated can be decided according to various statistical properties of the statistical distribution of the focus values, and the invention does not limit the statistical properties.

Based on the above, if the phase detection data detected by the phase detection autofocus circuit 240 using phase detection pixels is confirmed to be accurate and reliable, then the phase linear relationship for the phase detection autofocus procedure can be calibrated based on the phase detection data currently measured by the phase detection autofocus circuit 240. On the other hand, the processing circuit 250 does not execute the step of calibrating the phase linear relationship. Here, the phase detection data is generally a phase difference.

Therefore, in step S330, if the phase linear relationship for the phase detection autofocus procedure is to be calibrated, then the processing circuit 250 obtains a first phase difference detected when the lens 211 is located at one of the lens positions via the phase detection autofocus circuit 240 and obtains a second phase difference detected when the lens 211 is located at another one of the lens positions via the phase detection autofocus circuit 240. Then, in step S340, the processing circuit 250 calibrates the phase linear relationship of the phase detection autofocus procedure according to one of the lens positions, the first phase difference corresponding to the one of the lens positions, the another one of the lens positions, and the second phase difference corresponding to the another one of the lens positions.

Specifically, the processing circuit 250 can calibrate the phase linear relationship of the phase detection autofocus procedure at least according to the first phase difference and the second phase difference detected by the phase detection autofocus circuit 240 and according to the two lens positions corresponding to the first phase difference and the second phase difference to obtain a calibrated phase linear relationship meeting the current operating environment and operating conditions. Then, the image capture device 20 can execute phase detection autofocus using the calibrated phase linear relationship to more rapidly obtain accurate autofocus results.

However, the implementation of the invention is not limited to the above, and the content of the above embodiments can be arbitrarily modified or extended based on actual requirement. For instance, in an embodiment of the invention, the image capture device can adopt a hybrid autofocus system. When the image capture device adopts a hybrid autofocus system, the image capture device first directly moves the lens to a temporary focus position close to the optimal focus position by using the phase detection autofocus procedure. Then, the image capture device drives the lens to start moving from the temporary focus position, and executes the contrast-based autofocus procedure at the same time to obtain the optimal focus position. As a result, not only focus time can be reduced, accurate focus results can also be obtained. Hereinafter, an embodiment is provided to describe in detail how the image capture device of the invention estimates the phase linear relationship suitable for the surrounding environment and the current operating condition when the image capture device adopts a hybrid autofocus system.

Figure 4:
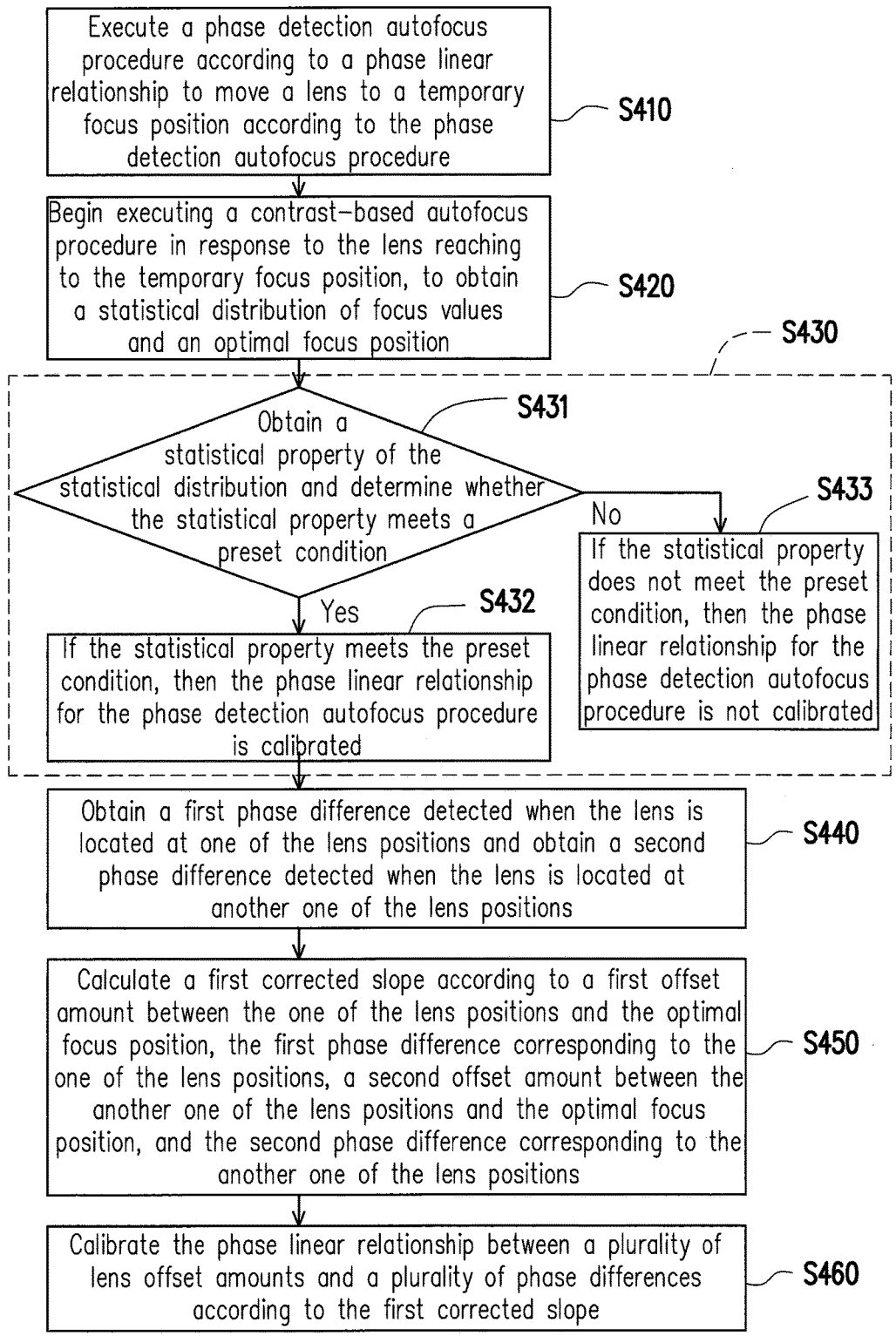
FIG. 4 is a flowchart of a calibration method of phase detection autofocus shown according to an embodiment of the invention.

FIG. 4 is a flowchart of a calibration method of phase detection autofocus shown according to an embodiment of the invention. Referring to both FIG. 2 and FIG. 4, the method of the present embodiment is suitable for the image capture device 20 of FIG. 2, and the detailed steps of the method of the present embodiment are described hereinafter with reference to each element of the image capture device 20 in FIG. 2.

In step S410, the phase detection autofocus circuit 240 executes the phase detection autofocus procedure according to the phase linear relationship to move the lens 211 to a temporary focus position according to the phase detection autofocus procedure. In step S420, the processing circuit 250 begins to execute the contrast-based autofocus procedure in response to the lens 211 reaching to the temporary focus position to obtain a statistical distribution of the focus values and the optimal focus position. It should be mentioned that, in the present embodiment, the processing circuit 250 does not obtain the focus values corresponding to all of the lens positions, but obtains the focus values corresponding to a portion of the lens positions close to the temporary focus position. Accordingly, the processing circuit 250 can still obtain the optimal focus position by searching the maximum value of the focus values and calculate the statistical distribution and statistical property according to the currently collected focus values.

In step S430, the processing circuit 250 determines whether to calibrate the phase linear relationship for the phase detection autofocus procedure according to the statistical distribution of the focus values. In the present embodiment, step S430 can be performed in steps S431 to S433. In step S431, the processing circuit 250 obtains a statistical property of the statistical distribution and determines whether the statistical property meets a preset condition. In an embodiment, the statistical property includes a statistical variance, and the preset condition includes whether or not a threshold value is exceeded. In other words, the processing circuit 250 obtains the statistical variance of the statistical distribution of the focus values and determines whether the statistical variance is greater than the threshold value to decide whether to calibrate the phase linear relationship or not. However, the invention is not limited thereto. For instance, in an embodiment, the statistical property includes the difference between the maximum value and the minimum value in the focus values, and the processing circuit can determine whether the difference between the maximum value and the minimum value is greater than the threshold value to decide whether to calibrate the phase linear relationship. Those having ordinary skill in the art can set the threshold value based on the actual situation and experimental results, but the invention is not limited thereto.

Then, in step S432, the processing circuit 250 decides to calibrate the phase linear relationship for the phase detection autofocus procedure if the statistical property of the focus values meets the preset condition. In step S433, the processing circuit 250 decides not to calibrate the phase linear relationship for the phase detection autofocus procedure if the statistical property does not meet the preset condition. Here, if the statistical property of the focus values does not meet the preset condition, then the current captured image has the condition of high noise and/or low contrast, and if the statistical property of the focus values meets the preset condition, then the current captured image has the condition of low noise and/or high contrast.

Figure 5A:
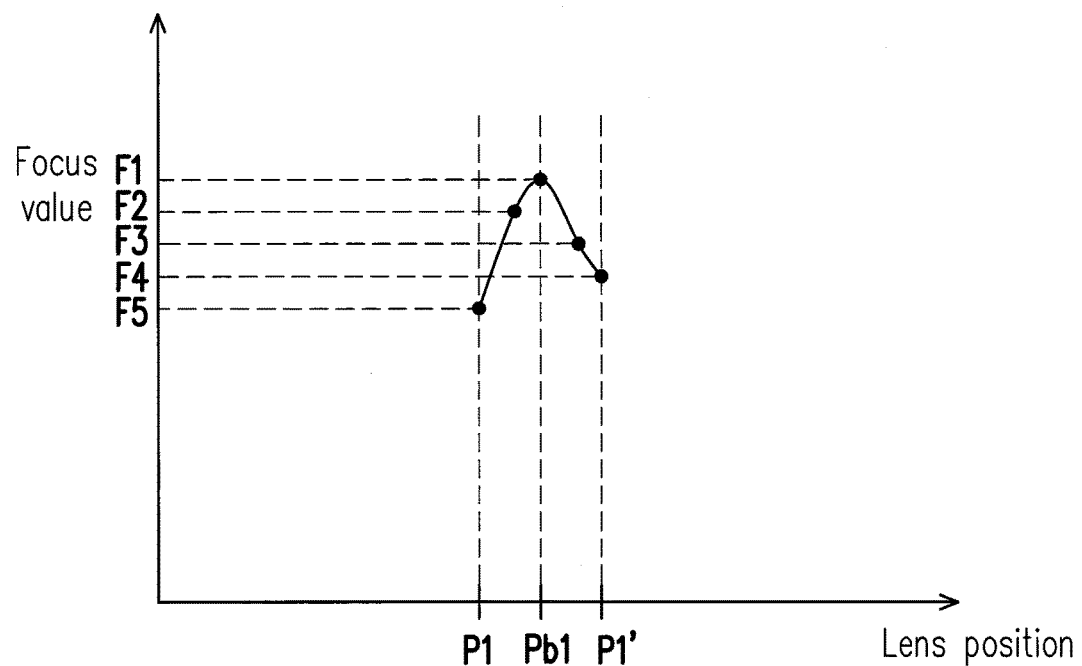
FIG. 5A and FIG. 5B are exemplary schematic diagrams of a statistical distribution of focus values shown according to an embodiment of the invention.
Figure 5B:
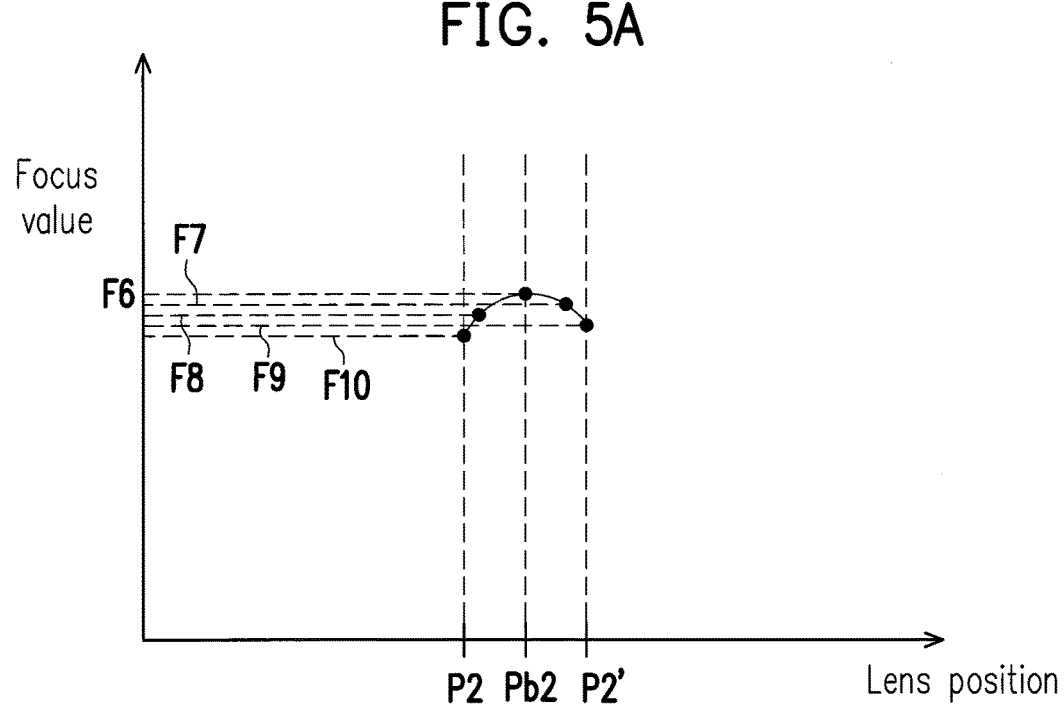

For instance, FIG. 5A and FIG. 5B are schematic diagrams of focus values obtained by using a hybrid autofocus system shown according to an embodiment of the invention. Referring first to FIG. 5A, it is assumed that a temporary focus position Pt is obtained from the phase detection autofocus procedure executed by the phase detection autofocus circuit 240. The processing circuit 250 begins to execute a contrast-based autofocus procedure in response to the movement of the lens 211 to the temporary focus position Pt. The processing circuit 250 drives the lens 211 to move from a temporary focus position P1 to a lens position P1' and obtains a plurality of corresponding focus values F1 to F5 by analyzing 5 images. Here, FIG. 5A is described using the 5 focus values F1 to F5 as an example, but the invention does not limit the number of focus values. The processing circuit 250 drives the lens 211 to move to an optimal focus position Pb1 by searching the maximum value of the plurality of focus values F1 to F5 to complete autofocus.

The operating environment and shooting scene of FIG. 5B are different from the operating environment and shooting scene of FIG. 5A. Similarly, referring to FIG. 5B, the processing circuit 250 begins to execute a contrast-based autofocus procedure in response to lens 211 reaching to a temporary focus position P2. The processing circuit 250 drives the lens 211 to move from the temporary focus position P2 to a lens position P2' and obtains a plurality of corresponding autofocus values F6 to F10 by analyzing a plurality of images.

Referring to both FIG. 5A and FIG. 5B, the processing circuit 250 decides whether to execute the subsequent steps of calibrating the phase linear relationship in different operating environments and shooting scenes by respectively calculating the statistical distribution and statistical property of the focus values F1 to F5 and the focus values F6 to F10. In the examples of FIG. 5A and FIG. 5B, the statistical variance of the focus values F1 to F5 is greater than the threshold value, but the statistical variance of the focus values F6 to F10 is not greater than the threshold value. In other words, the captured images corresponding to FIG. 5A are high contrast, and the captured images corresponding to FIG. 5B are low contrast. Therefore, the processing circuit 250 can decide to further calibrate the phase linear relationship using the currently detected phase difference according to the focus values F1 to F5 and can decide not to calibrate the phase linear relationship using the currently detected phase difference according to the focus values F6 to F10.

Returning to the process of FIG. 4, after deciding to calibrate the phase linear relationship for the phase detection autofocus procedure, in step S440, the processing circuit 250 obtains a first phase difference detected by the phase detection autofocus circuit 240 when the lens 111 is located at one of the lens positions and a second phase difference detected by the phase detection autofocus circuit 240 when the lens is located at another one of the lens positions. In an embodiment, the one of the lens positions is the optimal focus position obtained based on the contrast-based focus procedure, and the optimal focus position corresponds to the maximum value in the focus values, but the invention is not limited thereto. The one of the lens positions and the another one of the lens positions can be any positions that the lens 211 passed through when the processing circuit 250 executes the contrast-based autofocus procedure, but the one of the lens positions is different from the another one of the lens positions. In other words, the one of the lens positions and the another one of the lens positions can be optimal focus positions, temporary focus positions, or other lens positions the lens passed through during the contrast-based autofocus procedure, but the invention is not limited thereto.

In step S450, the processing circuit 250 calculates a first corrected slope according to a first lens offset amount between the one of the lens positions and the optimal focus position, the first phase difference corresponding to the one of the lens positions, a second lens offset amount between the another one of the lens positions and the optimal focus position, and the second phase difference corresponding to the another one of the lens positions. In step S460, the processing circuit 250 corrects the phase linear relationship between a plurality of lens offset amounts and a plurality of phase differences according to the first corrected slope. In other words, the processing circuit 250 can estimate the phase linear relationship meeting the current situation according to the phase difference currently detected by the phase detection autofocus circuit 240 and the lens offset amount of the lens 211 as long as the phase difference detected by the phase detection autofocus circuit 240 is confirmed to be reliable. Here, the lens offset amount is referred to the distance from the optimal focus position.

Moreover, in the present embodiment, the first corrected slope is calculated by two phase differences and two lens offset amounts as an example, but the invention is not limited thereto. In other embodiments, the processing circuit can, for instance, approach an optimal linear relationship according to two or more phase differences and two or more lens offset amounts to obtain the first corrected slope.

Figure 6:
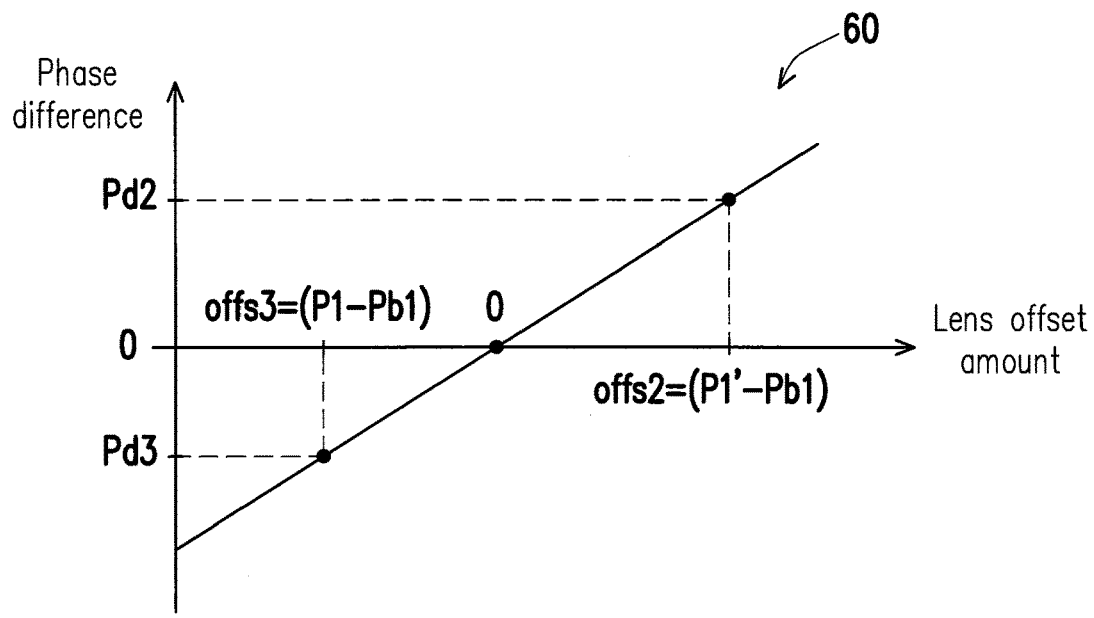
FIG. 6 is an exemplary schematic diagram of obtaining a first corrected slope shown according to an embodiment of the invention.

To describe steps S440 to S460 in detail, FIG. 6 shows an exemplary schematic diagram of obtaining a first corrected slope shown according to an embodiment of the invention. FIG. 6 is further described by using the example shown in FIG. 5A as an example. Referring to FIG. 5A and FIG. 6, if the processing circuit 250 decides to further calibrate the phase linear relationship using the currently detected phase difference according to the focus values F1 to F5, then the processing circuit 250 can obtain a first phase difference Pd3 detected by the phase detection autofocus circuit 240 when the lens 211 is located at the temporary focus position P1 and can obtain a second phase difference Pd2 detected by the phase detection autofocus circuit 240 when the lens 211 is located at the lens position P1'. Therefore, the processing circuit 250 calculates a first offset amount offs3 between the temporary focus position P1 and the optimal focus position Pb and calculates a second offset amount offs2 between the lens position P1' and the optimal focus position Pb. Then, the processing circuit 250 can calculate the first corrected slope of a real-time estimated relationship 60 according to the first offset amount offs3, the second offset amount offs2, the first phase difference Pd3, and the second phase difference Pd2. Then, the processing circuit 250 can correct the phase linear relationship between the lens offset amounts and the phase differences according to the first corrected slope.

For instance, by directly replacing the phase linear relationship currently recorded in the phase detection autofocus circuit 240 with the real-time estimated relationship having the first corrected slope, the processing circuit 250 can correct the phase linear relationship between the lens offset amounts and the phase differences according to the first corrected slope. More preferably, the processing circuit 250 can adjust a reference linear relationship according to the first corrected slope to correct the phase linear relationship according to the first corrected slope.

Figure 7:
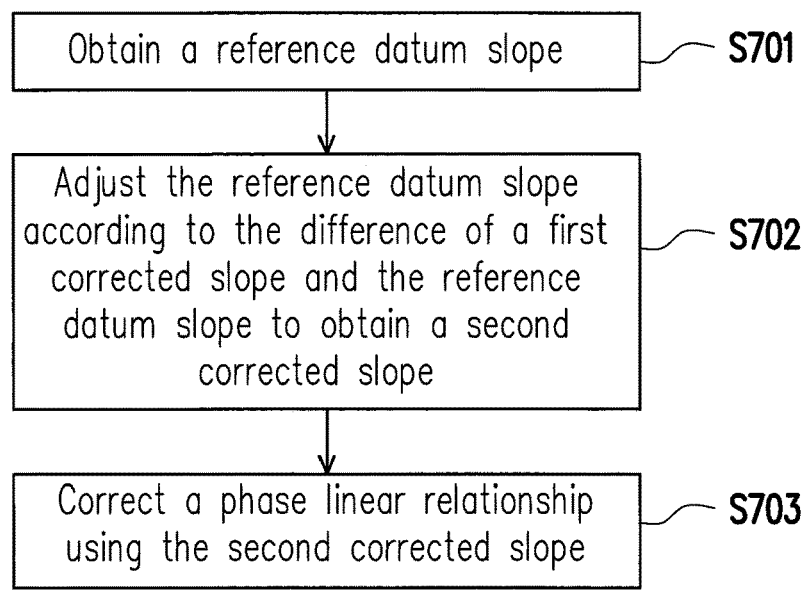
FIG. 7 is a detailed flowchart of step S460 shown according to an embodiment of the invention.

Specifically, FIG. 7 is a detailed flowchart of step S460 shown according to an embodiment of the invention. In step S701, the processing circuit 250 obtains a reference datum slope. In an embodiment, the reference datum slope includes a factory default slope or a statistical value of a plurality of history work slopes of a plurality of history phase linear relationships of different time points. The statistical value of the history work slope is, for instance, the average value of the history work slope. In step S702, the processing circuit 250 adjusts the reference datum slope according to the difference of the first corrected slope and the reference datum slope to obtain a second corrected slope. In step S703, the processing circuit 250 corrects the phase linear relationship using the second corrected slope.

In the present embodiment, the processing circuit 250 can, for instance, obtain a second corrected slope according to the first corrected slope produced by real-time estimation via formula (1).

$$M(n) = \text{Alpha}(n) * [(M(c) - Mu(n)) + Mu(n)] \qquad \text{formula (1)}$$

wherein $M(n)$ is the second corrected slope, $M(c)$ is the first corrected slope, $Mu(n)$ is the reference datum slope, and $\text{Alpha}(n)$ is a magnification adjustment factor. Based on the adjustments of formula (1), an unstable phase detection autofocus procedure caused by a large slope difference of the real-time estimated first corrected slope and the current phase linear relationship can be avoided. Then, by replacing the phase linear relationship currently recorded in the phase detection autofocus circuit 240 with the estimated linear relationship having the second corrected slope, the processing circuit 250 can correct the phase linear relationship between the lens offset amounts and the phase differences according to the second corrected slope.

Based on the above, in an embodiment of the invention, the image capture device can decide whether to further calibrate the phase linear relationship for the phase detection autofocus procedure according to the focus values obtained by a contrast-based autofocus procedure. When the phase difference currently detected by the statistical property of the focus values is confirmed to be accurate, the phase linear relationship more conforming to the actual application environment can be corrected in real-time by a highly reliable phase difference. Therefore, the image capture device can obtain more accurate phase detection autofocus results via the corrected phase linear relationship. As a result, the focus speed can be increased while ensuring the focus accuracy to enhance user experience. Moreover, in the present embodiment, the reference linear relationship is corrected using real-time estimated results to obtain the corrected phase linear relationship, such that the stability of the phase detection procedure can be ensured.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A calibration method of phase detection autofocus suitable for an image capture device having a lens, the method comprising:
    executing a contrast-based autofocus procedure to move the lens to a plurality of lens positions and obtain a statistical distribution of a plurality of focus values and an optimal focus position;
    determining whether to calibrate a phase linear relationship for a phase detection autofocus procedure according to the statistical distribution of the focus values;
    obtaining a first phase difference detected when the lens is located at one of the lens positions and obtaining a second phase difference detected when the lens is located at another one of the lens positions if the phase linear relationship for the phase detection autofocus procedure is to be calibrated;
    calibrating the phase linear relationship of the phase detection autofocus procedure according to the one of the lens positions, the first phase difference corresponding to the one of the lens positions, the another one of the lens positions, and the second phase difference corresponding to the another one of the lens positions; and
    before the step of the contrast-based autofocus procedure is executed, executing the phase detection autofocus procedure according to the phase linear relationship to move the lens to a temporary focus position according to the phase detection autofocus procedure,
    wherein the step of executing the contrast-based autofocus procedure comprises:
    executing the contrast-based autofocus procedure in response to moving the lens to the temporary focus position to obtain the statistical distribution of the focus values and the optimal focus position.

2. The calibration method of phase detection autofocus of claim 1, wherein the one of the lens positions is the optimal focus position obtained based on the contrast-based focus procedure, and the optimal focus position corresponds to a maximum value in the focus values.

3. The calibration method of phase detection autofocus of claim 1, wherein the step of determining whether to calibrate the phase linear relationship for the phase detection autofocus procedure according to the statistical distribution of the focus values comprises:
    obtaining a statistical property of the statistical distribution and determining whether the statistical property meets a preset condition;
    deciding to calibrate the phase linear relationship for the phase detection autofocus procedure if the statistical property meets the preset condition; and
    deciding not to calibrate the phase linear relationship for the phase detection autofocus procedure if the statistical property does not meet the preset condition.

4. The calibration method of phase detection autofocus of claim 3, wherein the statistical property comprises a statistical variance, and the preset condition comprises whether or not a threshold value is exceeded.

5. The calibration method of phase detection autofocus of claim 1, wherein the step of calibrating the phase linear relationship of the phase detection autofocus procedure according to the one of the lens positions, the first phase difference corresponding to the one of the lens positions, the another one of the lens positions, and the second phase difference corresponding to the another one of the lens positions comprises:
    calculating a first corrected slope according to a first lens offset amount between the one of the lens positions and the optimal focus position, the first phase difference corresponding to the one of the lens positions, a second lens offset amount between the another one of the lens positions and the optimal focus position, and the second phase difference corresponding to the another one of the lens positions; and
    correcting the phase linear relationship between a plurality of lens offset amounts and a plurality of phase differences according to the first corrected slope.

6. The calibration method of phase detection autofocus of claim 5, wherein the step of correcting the phase linear relationship according to the first corrected slope comprises:
    obtaining a reference datum slope;
    adjusting the reference datum slope according to a difference of the first corrected slope and the reference datum slope to obtain a second corrected slope; and
    correcting the phase linear relationship using the second corrected slope.

7. The calibration method of phase detection autofocus of claim 6, wherein the reference datum slope comprises a factory default slope or a statistical value of a plurality of history work slopes of a plurality of history phase linear relationships of different time points.

8. An image capture device, comprising:
    an optical system comprising a lens;
    an image sensor coupled to the optical system;
    a lens control circuit coupled to the optical system and controlling the lens to move to a plurality of lens positions;
    a phase detection autofocus circuit coupled to the image sensor and the lens control circuit and detecting a plurality of phase differences corresponding to the lens positions; and
    a processing circuit coupled to the image sensor, the phase detection autofocus circuit, and the lens control circuit, executing a contrast-based autofocus procedure to move the lens to the lens positions via the lens control circuit, obtaining a statistical distribution of a plurality of focus values and an optimal focus position, and determining whether to calibrate a phase linear relationship for a phase detection autofocus procedure according to the statistical distribution of the focus values,
    wherein if the phase linear relationship for the phase detection autofocus procedure is to be calibrated, then the processing circuit obtains a first phase difference detected by the phase detection autofocus circuit when the lens is located at one of the lens positions and obtains a second phase difference detected by the phase detection autofocus circuit when the lens is located at another one of the lens positions, and calibrates the phase linear relationship of the phase detection autofocus procedure according to the one of the lens positions, the first phase difference corresponding to the one of the lens positions, the another one of the lens positions, and the second phase difference corresponding to the another one of the lens positions, wherein before the processing circuit executes the step of the contrast-based autofocus procedure, the phase detection autofocus circuit executes the phase detection autofocus procedure according to the phase linear relationship to move the lens to a temporary focus position according to the phase detection autofocus procedure, wherein the processing circuit begins to execute the contrast-based autofocus procedure in response to the lens reaching to the temporary focus position to obtain the statistical distribution of the focus values and the optimal focus position.

9. The image capture device of claim 8, wherein the one of the lens positions is the optimal focus position obtained based on the contrast-based focus procedure, and the optimal focus position corresponds to a maximum value in the focus values.

10. The image capture device of claim 8, wherein the processing circuit obtains a statistical property of the statistical distribution and determines whether the statistical property meets a preset condition, wherein if the statistical property meets the preset condition, then the processing circuit decides to calibrate the phase linear relationship for the phase detection autofocus procedure, and if the statistical property does not meet the preset condition, then the processing circuit decides not to calibrate the phase linear relationship for the phase detection autofocus procedure.

11. The calibration method of phase detection autofocus of claim 10, wherein the statistical property comprises a statistical variance, and the preset condition comprises whether or not a threshold value is exceeded.

12. The image capture device of claim 8, wherein the processing circuit calculates a first corrected slope according to a first lens offset amount between the one of the lens positions and the optimal focus position, the first phase difference corresponding to the one of the lens positions, a second lens offset amount between the another one of the lens positions and the optimal focus position, and the second phase difference corresponding to the another one of the lens positions, and corrects the phase linear relationship between a plurality of lens offset amounts and a plurality of phase differences according to the first corrected slope.

13. The image capture device of claim 12, wherein the processing circuit obtains a reference datum slope to adjust the reference datum slope according to a difference of the first corrected slope and the reference datum slope to obtain a second corrected slope, and corrects the phase linear relationship by using the second corrected slope.

14. The image capture device of claim 13, wherein the reference datum slope comprises a factory default slope or a statistical value of a plurality of history work slopes of a plurality of history phase linear relationships of different time points.

* * * * *